2,784,231
MANUFACTURE OF N:N'-DIBENZYLETHYLENE-DIAMINE

William Glynne Moss Jones, Blackley, Manchester, England, assignor to Imperial Chemical Industries Limited, London, England, a corporation of Great Britain No Drawing. Application March 7, 1955,
Serial No. 492,749

Claims priority, application Great Britain March 12, 1954

4 Claims. (Cl. 260—570.9)

This invention is concerned with improvements in or relating to the manufacture of N:N'-dibenzylethylenediamine.

N:N'-dibenzylethylenediamine is a known compound and it is an important intermediate in the manufacture of particularly, therapeutically valuable salts of penicillin. It is known that alkyl derivatives of ethylene diamine can be made by reaction of ethylene diamine and alkyl halide. However under the hitherto proposed conditions, namely by interaction of benzyl chloride with ethylene diamine in solvent media, sufficient ethylene diamine being present to act as an acid-binding agent, or by reaction of equimolecular proportions of the two reagents in dilute aqueous alkali, the yield of the desired N:N'-dibenzylethylenediamine is low owing to the formation of tri- and tetra-benzylethylene diamines as byproducts.

We have found that these low yields are improved when the reaction is conducted in the presence of caustic alkali in amount and concentration sufficient under the conditions of reaction to act as an acid binding agent and to maintain the ethylene diamine substantially out of the aqueous reaction phase.

According to the invention therefore we provide a process for the manufacture of N:N'-dibenzylethylenediamine by the interaction of ethylenediamine and a benzyl halide, characterised in that the reaction is brought about in the presence of an aqueous solution of a caustic alkali initially of at least 50% strength weight for weight.

As caustic alkalis there may be used for example sodium hydroxide or potassium hydroxide.

As benzyl halides there may be used for example benzyl chloride.

The ethylenediamine may be used either as such or as its hydrate.

The invention is illustrated but not limited by the following example in which the parts are by weight:

Example

To a stirred mixture of 2925 parts of ethylene diamine monohydrate, 4,200 parts of caustic soda and 3,000 parts of water there are added gradually 7,556 parts of benzyl chloride. The temperature of the mixing is kept by external cooling at 60° C. Then 5,200 parts of toluene and 10,000 parts of water are added to the reaction mixture which is thoroughly agitated and then the toluene layer is separated and thoroughly washed with water. A mixture of 3,350 parts acetic acid and 8,700 parts of water is added and the mixture is thoroughly agitated. Then the aqueous layer is separated and the toluene layer is washed with 2,400 parts of water. To the combined aqueous extracts there are added 7,290 parts of an aqueous caustic soda solution ($d$:1.35) and the mixture is then extracted with 4,170 parts of toluene. 7,100 parts of acetone are added to the toluene extract and the mixture is heated to 50° C. and 1,676 parts of acetic acid are slowly added. The mixture is cooled and filtered and the solid residue is washed with 2,000 parts of acetone and dried. There are obtained 3,280 parts of the diacetate of N:N'-dibenzylethylenediamine of melting point 115° C.

What I claim is:

1. A process for the manufacture of N:N'-dibenzylethylenediamine by the interaction of ethylenediamine and benzyl chloride characterised in that the reaction is brought about in the presence of an aqueous solution of a caustic alkali initially of at least 50% strength by weight in an amount at least equivalent to the amount of hydrochloric acid liberated.

2. Process as claimed in claim 1 wherein the caustic alkali is sodium hydroxide.

3. Process as claimed in claim 1 wherein the caustic alkali is potassium hydroxide.

4. Process as claimed in claim 1 wherein the ethylenediamine is used in the form of its hydrate.

References Cited in the file of this patent
UNITED STATES PATENTS

| | | |
|---|---|---|
| 2,608,584 | Sprules et al. | Aug. 26, 1952 |
| 2,619,502 | Williams et al. | Nov. 25, 1952 |
| 2,627,491 | Szabo et al. | Feb. 3, 1953 |